May 7, 1935.  D. H. WEST ET AL  2,000,805

MACHINE TOOL AND HYDRAULIC ACTUATING MECHANISM THEREFOR

Filed March 16, 1932   7 Sheets-Sheet 2

Inventors
Donald H. West
Kenneth C. Monroe
By Attorneys

May 7, 1935. D. H. WEST ET AL 2,000,805
MACHINE TOOL AND HYDRAULIC ACTUATING MECHANISM THEREFOR
Filed March 16, 1932 7 Sheets-Sheet 7

Inventors
Donald H. West
Kenneth C. Monroe
By Attorneys
Southgate Hay & Hawley

Patented May 7, 1935

2,000,805

UNITED STATES PATENT OFFICE 2,000,805

MACHINE TOOL AND HYDRAULIC ACTUATING MECHANISM THEREFOR

Donald H. West, Marlboro, and Kenneth C. Monroe, Hudson, Mass., assignors to The Lapointe Machine Tool Company, Hudson, Mass., a corporation of Maine Application March 16, 1932, Serial No. 599,188

2 Claims. (Cl. 121—45)

This invention relates to machine tools and particularly to hydraulic actuating mechanism by which successive repeated movements of a reciprocating member in a machine tool may be effected and variably controlled. The invention is applicable to machine tools of various types, such as shapers, planers, turret lathes or grinders, in which a table or other part is repeatedly and automatically reciprocated during the operation of the machine.

It is the object of our invention to provide improved control devices for the hydraulic actuating mechanism in such machine tools, by means of which devices the reciprocating member may be brought to rest without shock, and may be quickly but gradually accelerated in a reverse direction.

A further object is to provide, in a machine tool having a reciprocating member and hydraulic actuating mechanism therefor, a main reversing valve and means for varying and controlling the rate of travel of said main reversing valve during the period of reversal of said reciprocating member.

Our invention further relates to arrangements and combinations of parts which will be hereinafter described and more particularly pointed out in the appended claims.

Preferred forms of the invention are shown in the drawings, in which.

Figures 1, 2:
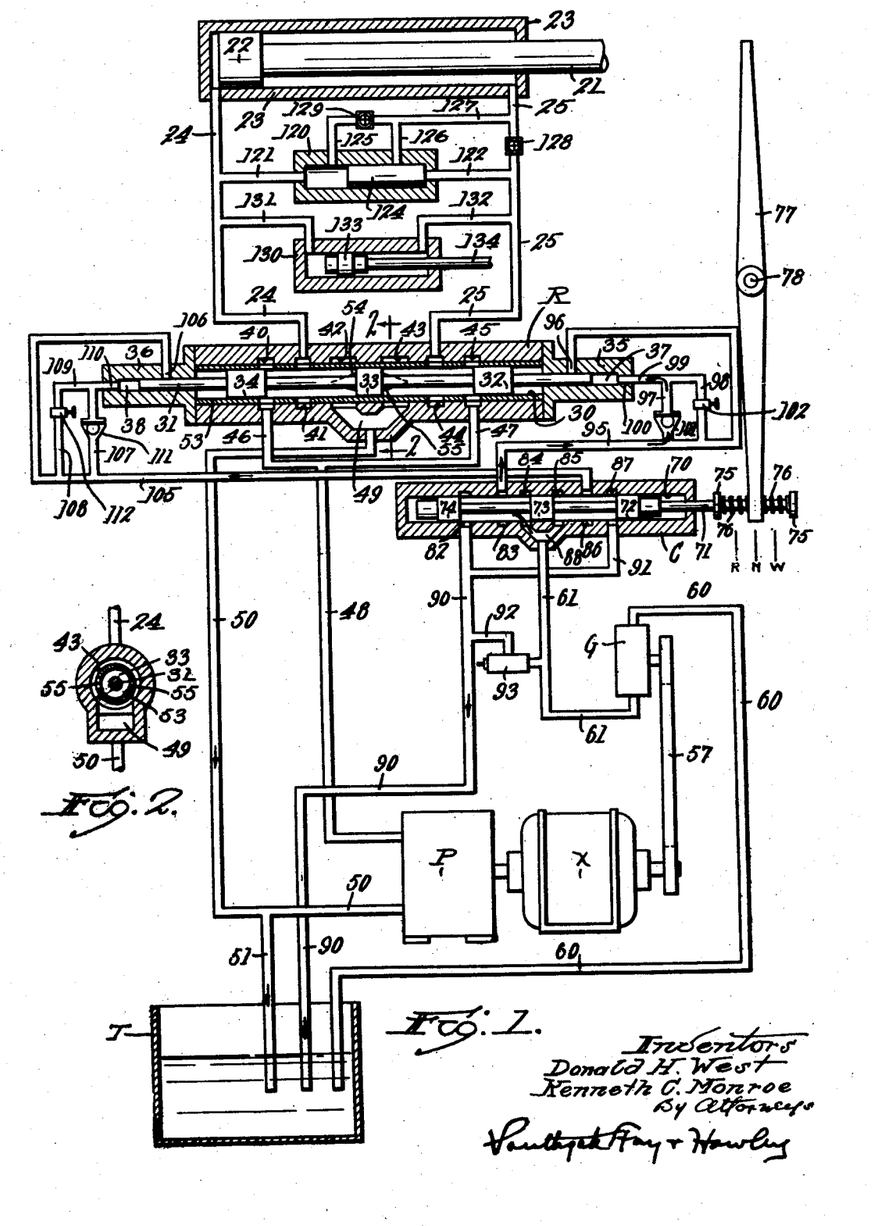
Fig. 1 is a diagrammatic view, partly in section, disclosing our invention and showing all mechanism in neutral or inoperative position.
Fig. 2 is a detail sectional view, taken along the line 2—2 in Fig. 1.
Figure 18:
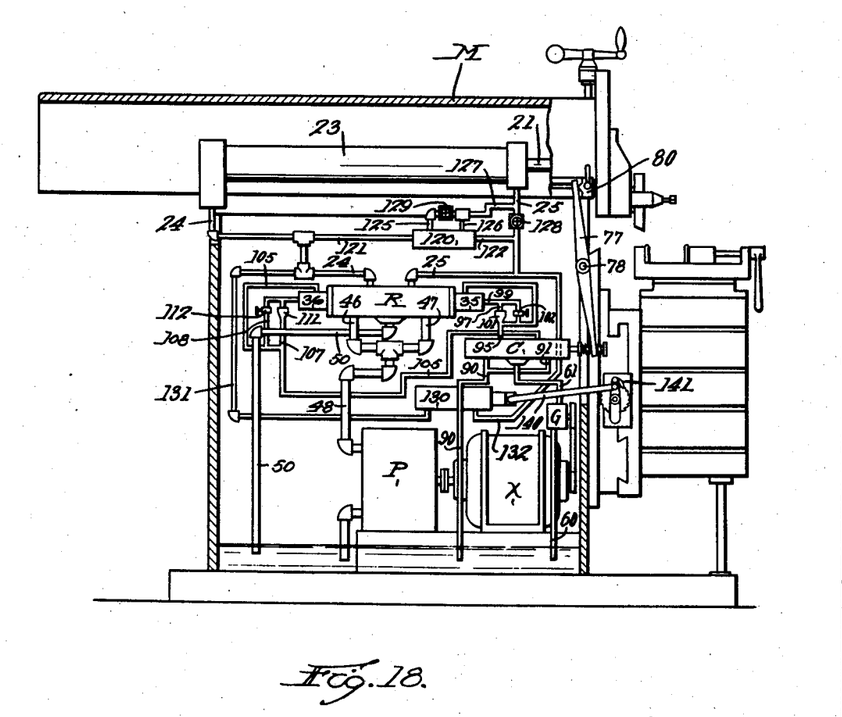
Fig. 18 is a side elevation of a shaper embodying our invention.

Referring particularly to Figs. 1 and 18, we have indicated parts of a machine tool, such as a shaper, having a tool support or other reciprocating member M, slidable in fixed guideways and suitably connected through a piston rod 21 to a piston or ram 22 slidable in a main hydraulic cylinder 23. In other machines to which our invention is applicable, the member M may support the work or a grinding wheel or any other reciprocated element of the machine.

The main cylinder 23 is connected at its opposite ends by pipes 24 and 25 to a reversing valve mechanism R, which preferably comprises a cylinder 30 having a valve rod 31 freely slidable therein and provided with spaced piston elements 32, 33 and 34. The ends of the valve rod 31 are slidable in extensions 35 and 36 of the cylinder casing and these extensions are provided with reduced cylindrical recesses or auxiliary cylinder spaces 37 and 38 closely fitting the rod 31.

The cylinder 30 is provided with a series of annular ports 40 to 45 inclusive. The pipe 24 previously described is connected to the annular port 41 and the pipe 25 to the annular port 44. The ports 40 and 45 are connected through branch pipes 46 and 47 to the discharge or delivery pipe 48 of a hydraulic pump P. The annular ports 42 and 43 are connected to a common exhaust recess 49 which in turn is connected by a pipe 50 to the intake of the pump P and by a branch pipe 51 to a storage tank T.

The reversing valve piston elements 32, 33 and 34 are slidable in a sleeve 53 forming a lining for the cylinder 30. The ports 40, 41, 44 and 45 are freely open through the lining 53 into the cylinder 30 but the ports 42 and 43 open into the cylinder 30 through triangular port openings 54 and 55 in the sleeve or lining 53. The triangular ports 55 are clearly shown in section in Fig. 2.

The pump P may be of any desired type which will provide a constant and positive discharge of oil or other liquid when operated continuously in one direction. This pump is continuously rotated from an external source of power, such as a motor X (Fig. 1), and the rate of discharge of the pump P may be varied in any convenient manner, as by varying the speed of the motor X.

An auxiliary gear pump or other low pressure pump G is also preferably driven from the motor X in any convenient manner, as by a belt 57. The gear pump G has a supply pipe 60 from the storage tank T and a delivery or discharge pipe 61 by which liquid under pressure is delivered to the casing of a control valve mechanism C.

This valve mechanism C comprises a cylinder 70 in which a control valve rod 71 is slidable, said valve rod being provided with spaced piston elements 72, 73 and 74. The valve rod 71 extends out through one end of the casing of the valve mechanism C and may be provided with pairs of collars 75 and springs 76, said springs forming a yielding connection to a reversing lever 77 pivoted at 78 and having its upper end projecting between dogs 80 and 81 (Figs. 3, 5 and 18) on the reciprocating member M or on some moving part associated therewith or with the piston rod 21.

The cylinder 70 of the control mechanism C is provided with annular ports 82 to 87 inclusive. The ports 84 and 85 are connected through a common passage 88 to the discharge pipe 61 of the gear pump G. The port 82 is connected to an exhaust pipe 90 by which liquid supplied by the gear pump G may be returned to the storage tank T. The port 87 is likewise connected by a branch pipe 91 to the exhaust pipe 90.

A by-pass 92 connects the discharge pipe 61 to the exhaust pipe 90 through a relief valve 93, so that the oil supplied by the pump G may return direct to the storage tank T when the pressure in the pipe 61 exceeds a predetermined limit.

The port 83 is connected by a pipe 95 to a port 96 in the side of the auxiliary cylinder space 37 in the casing extension 35 of the reversing valve mechanism R. The pipe 95 is also connected by branch pipes 97 and 98 to a pipe 99 connected to a port 100 in the outer end of the auxiliary cylinder space 37. An upwardly-opening check valve 101 is provided in the branch pipe 97 and an adjustable needle valve 102 in the branch pipe 98.

The port 86 is similarly connected through a pipe 105 to a port 106 in the side of the auxiliary cylinder space 38, and branch pipes 107 and 108 are connected through a pipe 109 and port 110 to the end of the cylinder space 38. The branch pipe 107 is provided with an upwardly-opening check valve 111 and the branch pipe 108 is provided with an adjustable needle valve 112, all as previously described.

A device for effecting a high speed working stroke of the member M without change in the rate of discharge of the pump P is also provided. This device comprises a cylinder 120 (Fig. 1) connected by pipes 121 and 122 to the pipes 24 and 25 which open into the ends of the main cylinder 23. A piston 124 is freely slidable in the cylinder 120. Ports in the side of the cylinder 120 are connected by branch pipes 125 and 126 to a pipe 127, which latter pipe connects into the pipe 25 above a manually operable shut-off valve 128. A similar shut-off valve 129 is provided in the branch pipe 125. The operation of this high speed mechanism will be hereinafter described.

In the preferred form of our invention, we also provide a feed cylinder 130, connected by branch pipes 131 and 132 to the main cylinder pipe connections 24 and 25 respectively. A feed piston 133 is slidable in the cylinder 130 and is connected by a piston rod 134 to actuate any desired feeding mechanism, such as the cross feed mechanism indicated in Fig. 18.

Having described the details of construction of the preferred form of our invention, the method of operation thereof will now be described, it being understood that heavy arrows indicate the flow of oil under pressure, and light arrows the flow of oil not under pressure.

Figure 3:
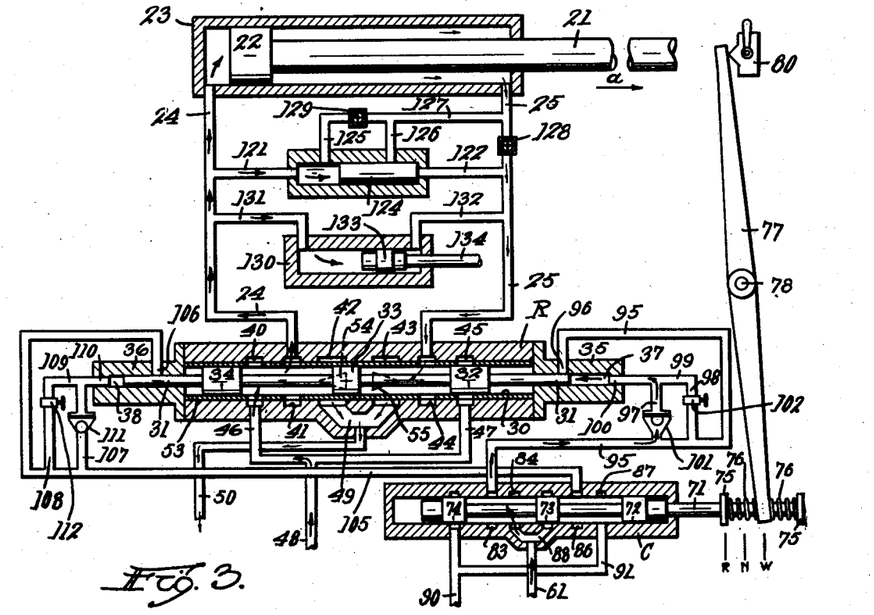
Fig. 3 is a partial sectional view similar to Fig. 1 but showing the position of the parts during acceleration to regular working speed.

Referring to Fig. 3, the parts are shown at the beginning of the first working stroke, during which the piston 22 and piston rod 21 will be accelerated and will move to the right or in the direction of the arrow a in Fig. 3. It is assumed that the reverse lever 77 has just been shifted manually from the neutral position shown in Fig. 1 to the operative or working position indicated in Fig. 3.

Such manual movement of the lever 77 shifts the control valve rod 71 and piston elements 72, 73 and 74 in the control valve mechanism C to the right, connecting the pressure pipe 61 through the ports 84 and 83 to the pipe 95, and connecting the pipe 105 through the ports 86 and 87 and the branch pipe 91 to the return or exhaust pipe 90.

Oil or other liquid under pressure is thus forced into the auxiliary cylinder space 37 at the right-hand end of the valve rod 31 in the reversing valve mechanism R, such oil flowing without restriction through the open check valve 101 and the branch pipe 97.

This application of pressure in the cylinder space 37 causes the valve rod 31 and piston elements 32, 33 and 34 of the reversing piston valve to be moved to the left from neutral position to the position shown in Fig. 3. This valve movement is quite slow, however, being resisted by the oil in the cylinder space 38, which can only escape through the needle valve 112, as the check valve 111 is closed by the pressure of oil thereon.

The reversing piston elements 32, 33 and 34 are thus moved to such a position that the pump discharge or pressure pipe 48 is connected through the branch pipe 46 and ports 40 and 41 to the pipe 24 which connects to the left-hand end of the main actuating cylinder 23. At the same time, the pipe 25 connects the right-hand end of the cylinder 23 through the ports 44 and 43 to the passage 49 and thence through the exhaust pipe 50 to the storage tank T or to the intake of the pump P. The shut-off valve 129 is assumed to be closed and the valve 128 is assumed to be open.

It will be noted that the piston element 33 of the reversing valve only partially covers the triangular ports 54 when in the accelerating position shown in Fig. 3, so that a portion of the oil admitted under pressure through the pipes 48 and 46 escapes through the triangular ports 54 and the annular port 42 to the passage 49 and the exhaust pipe 50. Consequently the piston 22 and parts associated therewith are accelerated gradually by oil at reduced pressure, which pressure, however, gradually increases as the reversing valve element 33 continues its travel to the left under the control of the needle valve 112, gradually closing the ports 54.

Figure 4:
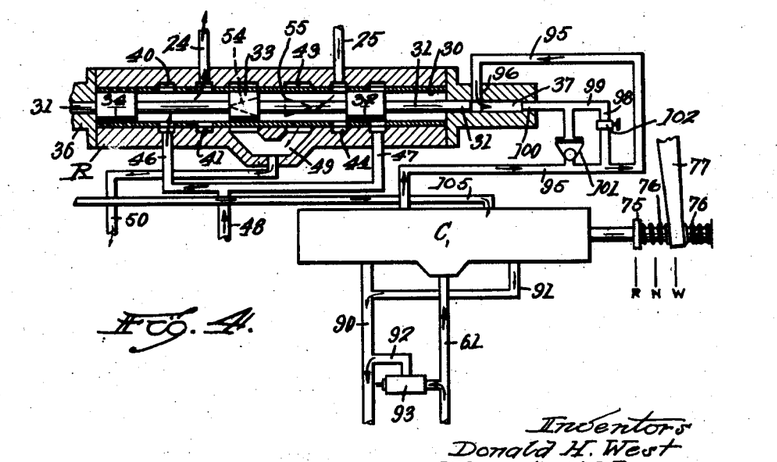
Fig. 4 is a similar view showing the position of the parts during a working stroke.

When the reversing valve reaches the final position shown in Fig. 4, the triangular ports 54 are fully covered by the piston element 33, and the full pressure of the pump P is applied directly against the piston 22. In this final position of the reversing valve, its valve rod 31 uncovers the port 96 for a purpose to be hereinafter described.

Any oil delivered from the gear pump G in excess of the small amount required to move the reversing valve is by-passed through the relief valve 93 and cross connection 92 back to the storage tank T.

As soon as pressure is applied in the pipe 24, this pressure is communicated through the pipe 131 to the cylinder 130 and moves the feed piston 133 to the right to effect movement of any desired feeding mechanism. In Fig. 18, we have indicated the piston 133 as connected by a link 140 to the feed pawl 141 of a conventional cross feed mechanism. The feed pawl 141 may be reversed, so that movement of the piston 133 to the right may cause either a feeding or a return movement of the feed pawl, as may be desired.

The parts remain in the position shown in Fig. 4 during the remainder of the working stroke at full uniform speed, with the ports 54 fully covered by the piston element 33 of the reversing valve and with the ports 55 fully open.

Figure 5:
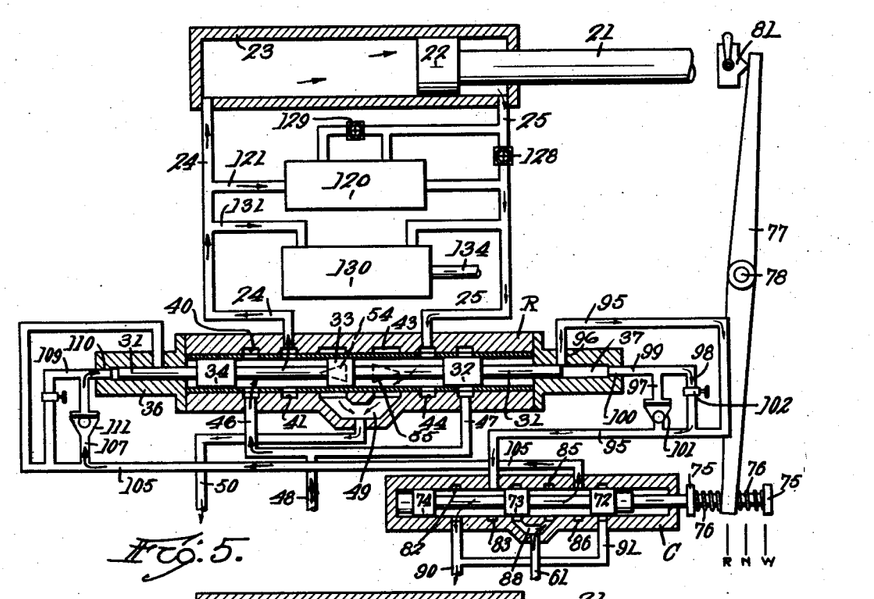
Figs. 5, 6 and 7 are views similar to Figs. 3 and 4 but showing successive positions of the valve mechanism as the reciprocating member is brought to rest.

As the piston 22 approaches the end of its working stroke, the dog 81 will engage and reverse the position of the lever 77, shifting the lever to the return position indicated in Fig. 5. This shifts the valve rod 71 and piston elements 72, 73 and 74 of the control valve mechanism C to the left-hand position shown in Fig. 5, connecting the pressure pipe 61 to the pipe 105 and connecting the pipe 95 to the exhaust pipe 90.

Pressure is thus applied through the branch pipe 107 and open check valve 111 to the cylinder space 38 at the left-hand end of the valve rod 31, while the right-hand cylinder space 37 is freely connected through the port 96 to the pipe 95, which in turn is connected through the control valve mechanism C to the exhaust pipe 90.

There is thus little or no resistance to the movement of the valve rod 31 and piston elements 32, 33 and 34 to the right until the valve rod 31 has moved far enough to cover the port 96. A portion of each triangular port 54 is thus quickly uncovered, and the pressure of the oil delivered to the left-hand end of the cylinder 23 is likewise reduced, correspondingly reducing the driving force on the piston 22. The piston 22 continues to move to the right, however, in part from the inertia and momentum of the table or other reciprocated member M.

Figure 6:
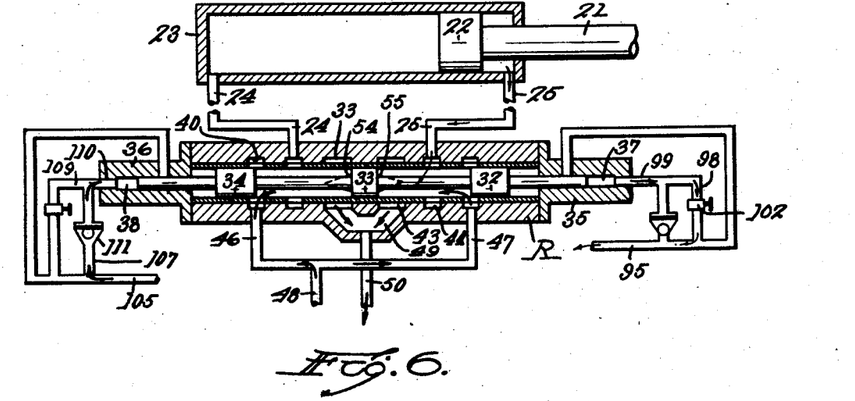

The reversing valve rod 31 and piston elements 32, 33 and 34 thereafter continue their movement to the right but at a relatively slow rate, as such further movement is under the control of the needle valve 102. When the parts reach the position shown in Fig. 6, the triangular ports 54 and 55 are both fully open and there is practically no oil pressure on either face of the piston 22, but the piston and associated parts continue to move from inertia and momentum.

Figure 7:
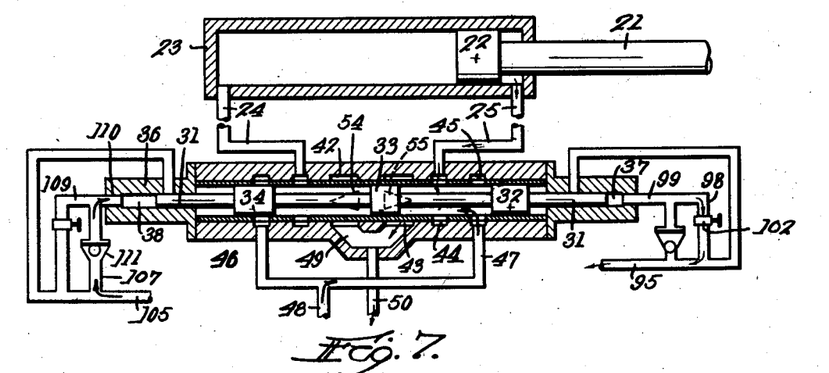

Continued movement of the reversing valve rod 31 and associated piston parts to the position shown in Fig. 7 gradually closes the triangular ports 55, thus restricting the exhaust from the right-hand end of the cylinder 23, which restricted exhaust acts as a hydraulic brake to overcome the remaining inertia or momentum of the piston 22 and associated parts, and to bring all of these reciprocating elements to rest.

Figure 8:
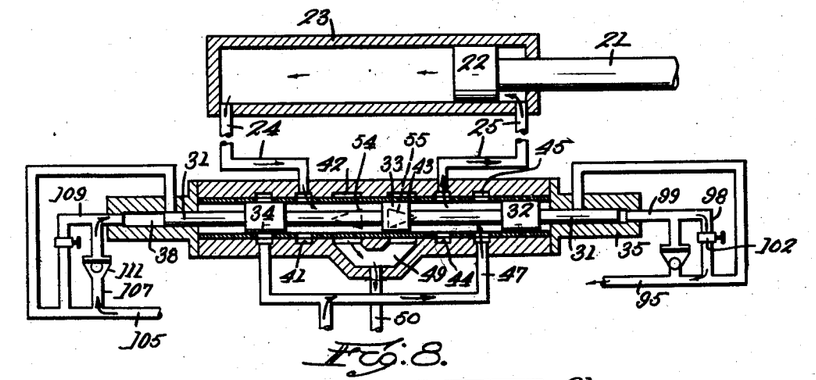
Fig. 8 is a similar sectional view showing the position of the parts during acceleration on the return movement.

Still further movement of the reversing valve rod 31 and associated piston elements to the right further reduces the available port opening of the triangular ports 55, and accordingly permits the oil entering through the pipes 48, 47 and 25 to build up pressure at the right-hand side of the piston 22, as indicated in Fig. 8, thus bringing the reciprocating parts to rest and initiating a gradually accelerated return movement of these reciprocating parts.

Figure 9:
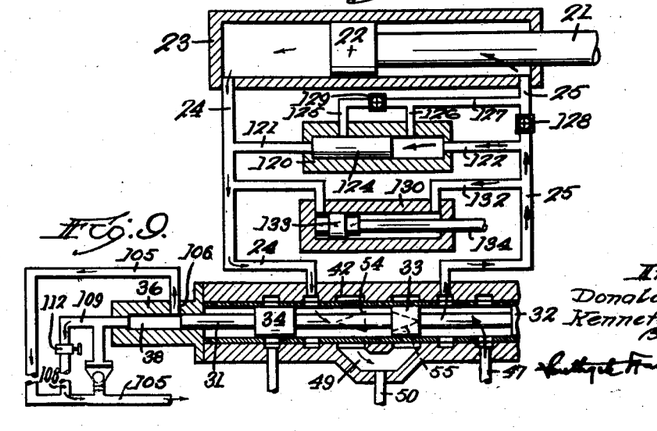
Fig. 9 shows the position of the parts during the regular return movement.

When the reversing valve rod 31 reaches its extreme right-hand position, as indicated in Fig. 9, the triangular ports 55 are fully covered and the piston 22 is moved to the left on its return stroke at a speed substantially double that of the working stroke, due to the fact that the cross section of the piston rod 21 is substantially one-half of the cross section of the piston 22. The piston rod thus fills one-half of the space in the cylinder 23 at the right-hand side of the piston and leaves only one-half the cylinder volume per unit of length to be filled by the oil.

As soon as the ports 55 are substantially closed and pressure is built up in the pipe 25, the feeding piston 133 is moved to the left, as shown in Fig. 8, thus completing the feeding cycle.

Figure 10:
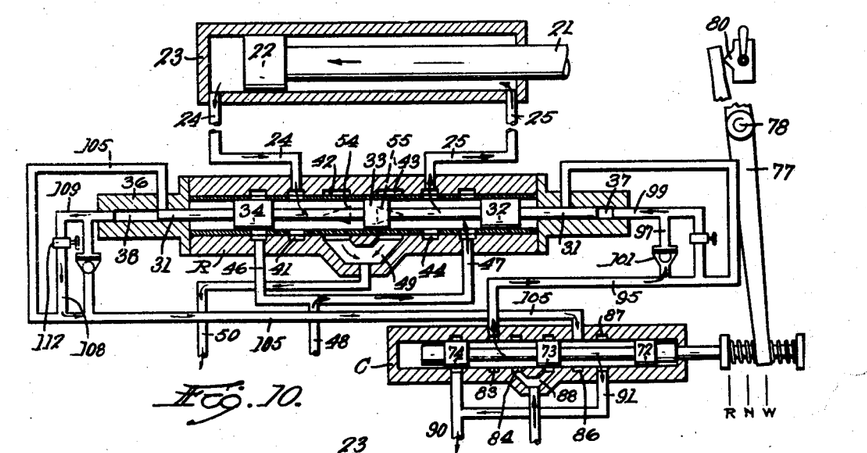
Figs. 10, 11 and 12 are similar views showing successive valve positions as the reciprocated member is brought to rest at the end of its return movement.

As the piston 22 approaches its left-hand limit of travel, the dog 80 engages the reversing lever 77 and shifts the lever to the working position indicated in Fig. 10, which restores the control mechanism to the position shown in Fig. 3 and applies pressure to the right-hand end of the reversing valve rod 31, moving the valve rod and associated piston elements quickly from the extreme right-hand position shown in Fig. 7 to the intermediate position shown in Fig. 10, in which position the port 106 is closed.

Figures 11, 13:
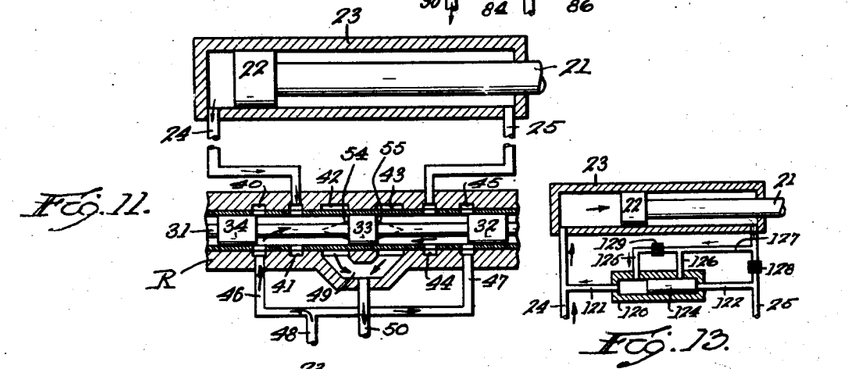
Figs. 13 and 13a are detail sectional views showing successive positions of certain speed control valve mechanism during high speed operation and return.
Figures 12, 13A:
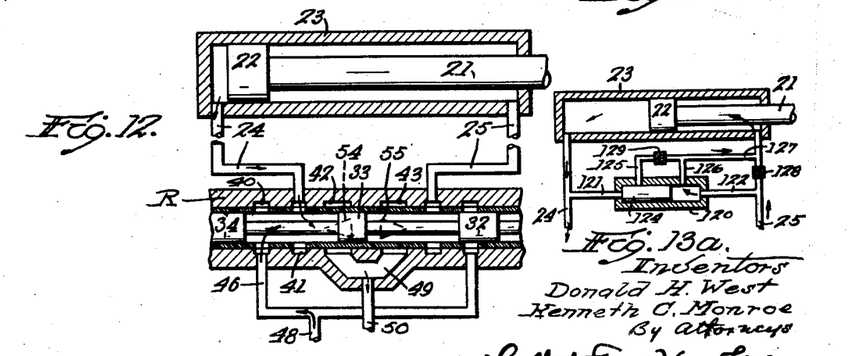

Continued slow movement of the valve rod 31 and piston elements 32, 33 and 34 gradually reduces the effective pressure on the right-hand face of the piston 32 and builds up a braking pressure against the left-hand face of the piston 22 until the piston 22 and associated reciprocating parts are gradually brought to rest. The operation is substantially the same as previously described at the end of the working stroke and successive steps in this operation are indicated in Figs. 11 and 12.

Working pressure is then built up as in Fig. 3, and the parts thereafter resume the full working position indicated in Fig. 4, the cycle of operations being thus completed.

By the use and operation of our actuating and control mechanism as above described, the piston 22 and associated parts may be reciprocated at high speed and may be very quickly brought to rest and reversed without shock. The controlled movement of the reversing valve is a very important feature of our invention, and particularly the rapid movement of the valve at the beginning of each reversal, followed by gradual and controlled movement during the latter part of each reversal.

It will be understood that the rate of movement of the reversing valve in either direction during the latter part of the valve travel is separately determined by the setting of the needle valves 102 and 112, and may be varied as desired by changing the setting of these valves.

During the operation of the machine as above described, it has been assumed that the shut-off valve 128 was open and the valve 129 was closed. If it is desired to operate at high speed during the working stroke, the valve 128 may be closed and the valve 129 opened, in which case the operation will be as indicated in Figs. 13 and 13ª.

During the working stroke shown in Fig. 13, the pressure of the oil in the pipe 24 and branch pipe 121 will then shift the piston 124 to the right, uncovering the port to which the pipe 125 is connected. Oil from the right-hand end of the cylinder 23 will be unable to reach the exhaust pipe 25, as the valve 128 is closed and the branch pipe 126 is blocked off by the piston 124 and accordingly this oil from the right-hand end of the cylinder 23 must pass through the pipe 127, valve 129 and pipe 121 into the pipe 24 through which it is returned to the left-hand end of the cylinder 23.

Consequently this oil will be added to the oil delivered to the cylinder 23 from the pump P and a given amount of oil delivered by the pump will produce a greater movement of the piston 22.

When the return stroke begins, pressure is applied to the pipe 25 and the piston 124 is shifted to the left, so that the pipe 25 is connected through the branch pipe 122, cylinder 120 and pipes 126 and 127 around the closed valve 128. The piston 22 is thus operated as usual on its return stroke, which will be at the same rate as previously described.

It will be seen therefore that the high speed mechanism increases the rate of the working stroke but does not change the rate of the return stroke.

In Figs. 14 to 17 inclusive, we have shown a modified construction, in which the valve rod 31 of the reversing valve mechanism R' is extended through the ends of the cylinder extensions 150 and 151 and is provided with coil springs 152 and 153 secured thereon by collars 154.

Figure 14:
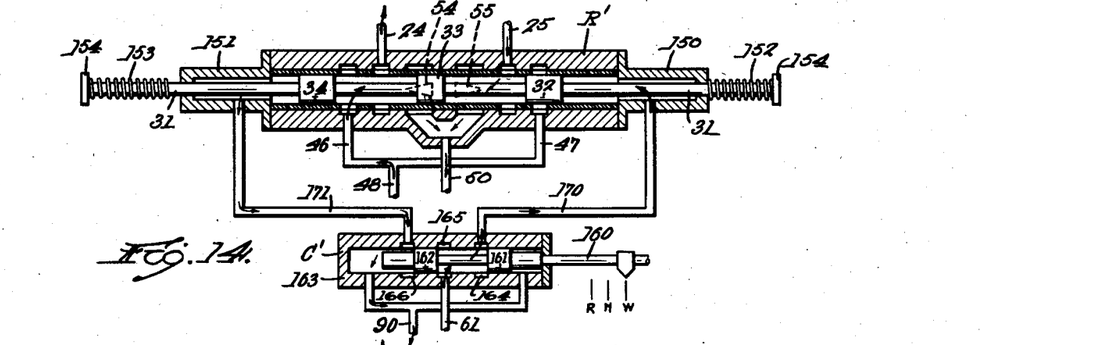
Figs. 14 to 17 are diagrammatic sectional views illustrating the operation of a modified construction.
Figure 15:
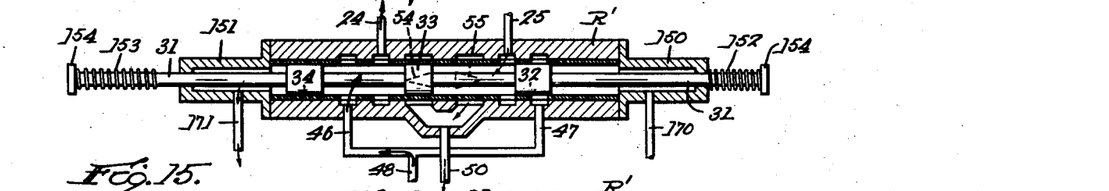

The control valve mechanism C' has a valve rod 160 slidable therein and provided with spaced piston elements 161 and 162. The control cylinder 163 is also provided with annular ports 164, 165 and 166.

The supply or pressure pipe 61 is connected to the middle port 165. The right-hand port 164 is connected by a pipe 170 to the right-hand cylinder extension 150 of the reversing valve mechanism R', and the left-hand port 166 is connected by a pipe 171 to the left-hand cylinder extension 151. The reversing mechanism for the control valve C' is assumed to be similar to that previously described.

When the piston elements 161 and 162 of the control valve mechanism C' are shifted to the working position indicated in Fig. 14, pressure through the pipe 170 moves the reversing piston elements 32, 33 and 34 in the valve mechanism R' to the left. This movement is at first relatively rapid until the parts reach the mid-position shown in Fig. 16 but is thereafter at a gradually decreasing rate as the spring 152 is compressed and offers gradually increased resistance to the movement of the reversing valve rod 31. Such movement continues, however, until the piston elements 32, 33 and 34 reach the full speed working position indicated in Fig. 15.

Figure 16:
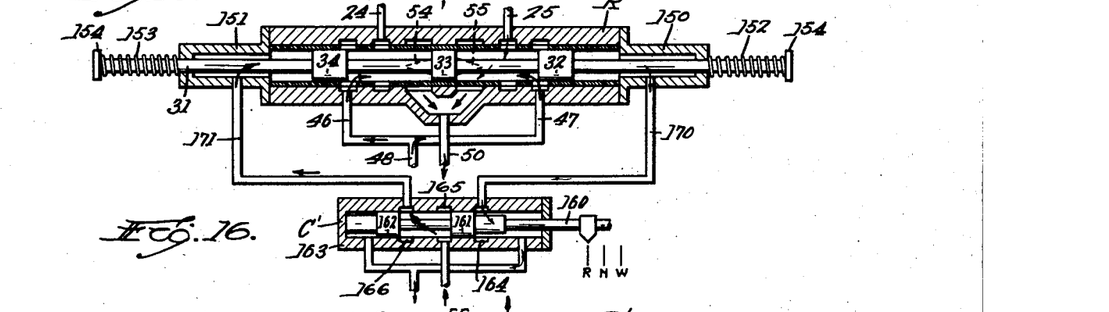

When the working stroke is nearly completed, the valve rod 160 and piston elements 161 and 162 in the control mechanism C' are shifted to the position shown in Fig. 16, applying pressure through the pipe 171 to the cylinder space in the left-hand extension 151 and connecting the right-hand extension 150 through the pipe 170 to the exhaust.

Figure 17:
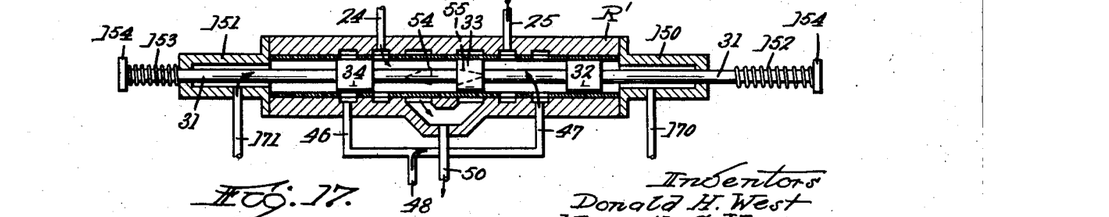

The oil pressure at the left-hand end of the reversing valve is thus added to the pressure of the spring 152 to bring the main reversing valve quickly to the mid-position shown in Fig. 16, after which the reversing valve moves at gradually reduced speed to the return position indicated in Fig. 17.

This form of our invention thus operates in a general way similarly to the preferred form and possesses many of the advantages thereof. With either form of the invention, the speed control and reversal of reciprocating parts at high speed is very satisfactorily effected.

The triangular exhaust ports 54 and 55 are very important features of our invention, as they gradually reduce the rate at which the effective by-pass exhaust opening is diminished by continued movement of the reversing valve. This gradual reduction in rate of diminution prevents shock and causes the reciprocating member to be reversed smoothly and evenly, even during high speed operation.

Figure 19:
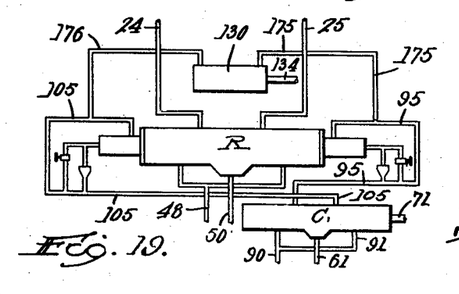
Fig. 19 is a diagrammatic view of a slight modification of the connections to the feeding mechanism.

In Fig. 19, we have shown a slight modification of our invention, in which the feed cylinder 139 is connected by pipes 175 and 176 to the pipes 95 and 105 respectively, between the control valve mechanism C and the reversing valve mechanism R, instead of being connected to the pipes 24 and 25 between the reversing valve mechanism R and the main cylinder 23.

The connections shown in Fig. 19 effect more prompt operation of the feeding mechanism upon reversal.

Having thus described our invention and the advantages thereof, we do not wish to be limited to the details herein disclosed, otherwise than as set forth in the claims, but what we claim is:—

1. A machine tool comprising a reciprocating member, a main cylinder and piston connected to move said member, a source of supply of liquid under pressure, connections from said source of liquid supply to each end of said main cylinder, a reversing valve in said connections, a control valve for said reversing valve, shifting means for said control valve, means associated with said reciprocating member effective to actuate said shifting means as said member approaches each end of its path of travel, and means to cause said reversing valve to move relatively rapidly during the first part of its reversing movement after said control valve is shifted and to move relatively slowly during the latter part of its reversing movement, said reversing valve including a port-closing piston and having a pair of exhaust ports in said connection for the two ends of said cylinder, said ports being axially separated by a distance not less than the axial length of said port-closing piston, whereby one exhaust port will be fully uncovered before said piston begins to cover the second exhaust port and whereby a gradual deceleration of said piston and associated reciprocating member will be effected.

2. The combination in a machine tool as set forth in claim 1, in which the exhaust ports increase progressively in circumferential width toward each other and in the direction in which they are uncovered by said piston.

DONALD H. WEST.
KENNETH C. MONROE.